US007448697B2

(12) United States Patent
Brancolini

(10) Patent No.: US 7,448,697 B2
(45) Date of Patent: Nov. 11, 2008

(54) TRACTOR BRAKING DEVICE

(75) Inventor: Emiliano Brancolini, Modena (IT)

(73) Assignee: CNH America LLC, New Holland, PA (US)

( * ) Notice: Subject to any disclaimer, the term of this patent is extended or adjusted under 35 U.S.C. 154(b) by 304 days.

(21) Appl. No.: 11/182,608

(22) Filed: Jul. 15, 2005

(65) Prior Publication Data

US 2006/0012243 A1 Jan. 19, 2006

(30) Foreign Application Priority Data

Jul. 16, 2004 (IT) .......................... BO2004A0444

(51) Int. Cl.
*B60T 13/00* (2006.01)

(52) U.S. Cl. ................. 303/9.61; 303/9.62; 188/106 P; 188/345; 188/349

(58) Field of Classification Search ................ 303/9.61, 303/9.62, 186–190, 123; 188/106 P, 345, 188/349
See application file for complete search history.

(56) References Cited

U.S. PATENT DOCUMENTS 3,640,067 A * 2/1972 Ingram ........................ 60/561
3,699,679 A * 10/1972 Bardos et al. ................. 60/579
3,863,991 A * 2/1975 Wilson ...................... 303/9.61
4,547,967 A * 10/1985 Reynolds et al. ............... 303/7
4,685,745 A * 8/1987 Reinecke .................... 303/191
6,168,244 B1 * 1/2001 Maske ........................... 303/3
6,193,331 B1 * 2/2001 Yonemura et al. ........... 303/186
6,572,201 B2 * 6/2003 Brancolini ................. 303/9.69
6,601,927 B2 * 8/2003 Sakamoto ................... 303/137
6,616,246 B1 * 9/2003 Williamson et al. ........ 303/9.62
6,817,681 B2 * 11/2004 Fey et al. ................. 303/113.4

* cited by examiner

*Primary Examiner*—Robert A. Siconolfi
*Assistant Examiner*—Mariano Sy
(74) *Attorney, Agent, or Firm*—Patrick M. Sheldrake; John William Stader; Michael G. Harms

(57) ABSTRACT

A tractor braking device has a first hydraulic circuit for activating a rear left brake and a second hydraulic circuit for activating a rear right brake. Simultaneous activation of both hydraulic circuits actuates at least one front brake in addition to at least one rear brake.

9 Claims, 3 Drawing Sheets

TRACTOR BRAKING DEVICE

FIELD OF THE INVENTION

The present invention relates to a farm tractor braking device.

BACKGROUND OF THE INVENTION

In certain countries, changes have recently been made to regulations governing the safety of four-wheel-drive vehicles. In these countries, it is now required that braking of at least two wheels be guaranteed even in the event of failure of part of the hydraulic brake feed circuits. The purpose of these requirements is to ensure safer, more reliable braking of the tractor, even in the event of component breakdown, while at the same time allowing braking of each rear wheel individually for more effective steering, which is presently a common design feature on tractors. The Japanese market, for example, only approves tractors of over 35 km/h if two wheels can be braked even in the event of failure of a hydraulic brake feed system pipe (or component).

SUMMARY OF THE INVENTION

The present invention is aimed at improving tractor braking capacity without excessively affecting the Applicant's current model range. With many current models, to make a tight right turn, for example, in addition to turning the vehicle to the right by turning the steering wheel clockwise, the rear right wheel must also be braked so that the vehicle "pivots" about it as about a fulcrum.

In order to allow pivoting in both directions, current tractors are equipped with two pedals, each of which, when pressed by the operator, activates a respective master cylinder (or booster) to feed pressurized oil to a respective rear brake. Such circuits also comprise a logic valve to which part of the pressurized oil from the two rear brake feed lines is diverted. If both pedals are pressed, the logic valve also allows oil flow to the two front brakes. Circuits of this type, however, are unsafe, in that, in the event of failure of either of the rear feed pipes, or even of the front pipe when braking using both (mechanically connected) pedals simultaneously; the vehicle cannot be braked (so-called "total brake loss").

Hydraulic circuits of this type are approved, however, in some countries and for certain applications because of the presence of a so-called "safety brake" connected to the handbrake which acts on the drive. In the event of a failure of the normal brake circuit, the handbrake lever can be operated to simultaneously brake the rear wheels and decelerate the tractor. Moreover, many currently marketed tractors have an indicator light, which, in the event of hydraulic power loss, informs the operator that the hydraulic system is not working properly. This applies to hydraulic power-assist braking systems.

In this case, however, the clutch governing operation of the four drive wheels fails to engage, thus impairing braking performance of the tractor.

In this connection, it should be pointed out that, being "positive" (i.e. spring-engaged and pressure-released), the clutch governing the four drive wheels ensures automatic engagement when braking with both brake pedals pressed in any malfunction condition, including hydraulic pressure loss.

It is an object of the present invention to provide a tractor braking device designed to eliminate the aforementioned drawbacks. According to the present invention, there is provided a tractor braking device as claimed in claim 1. The hydraulic braking device is designed for a tractor with at least four braking wheels.

The main object of the present invention is to maintain the possibility of braking each rear wheel separately by pressing the corresponding pedal, and to also permit braking of the four drive wheels when both pedals are pressed simultaneously. In the event of failure of a branch or component part of the hydraulic circuit, the device according to the present invention also ensures braking of at least two of the four wheels of the tractor.

BRIEF DESCRIPTION OF THE DRAWINGS

A number of non-limiting embodiments of the present invention will be described by way of example with reference to the accompanying drawings, in which.

DETAILED DESCRIPTION OF THE EXEMPLARY EMBODIMENTS

Figure 1:
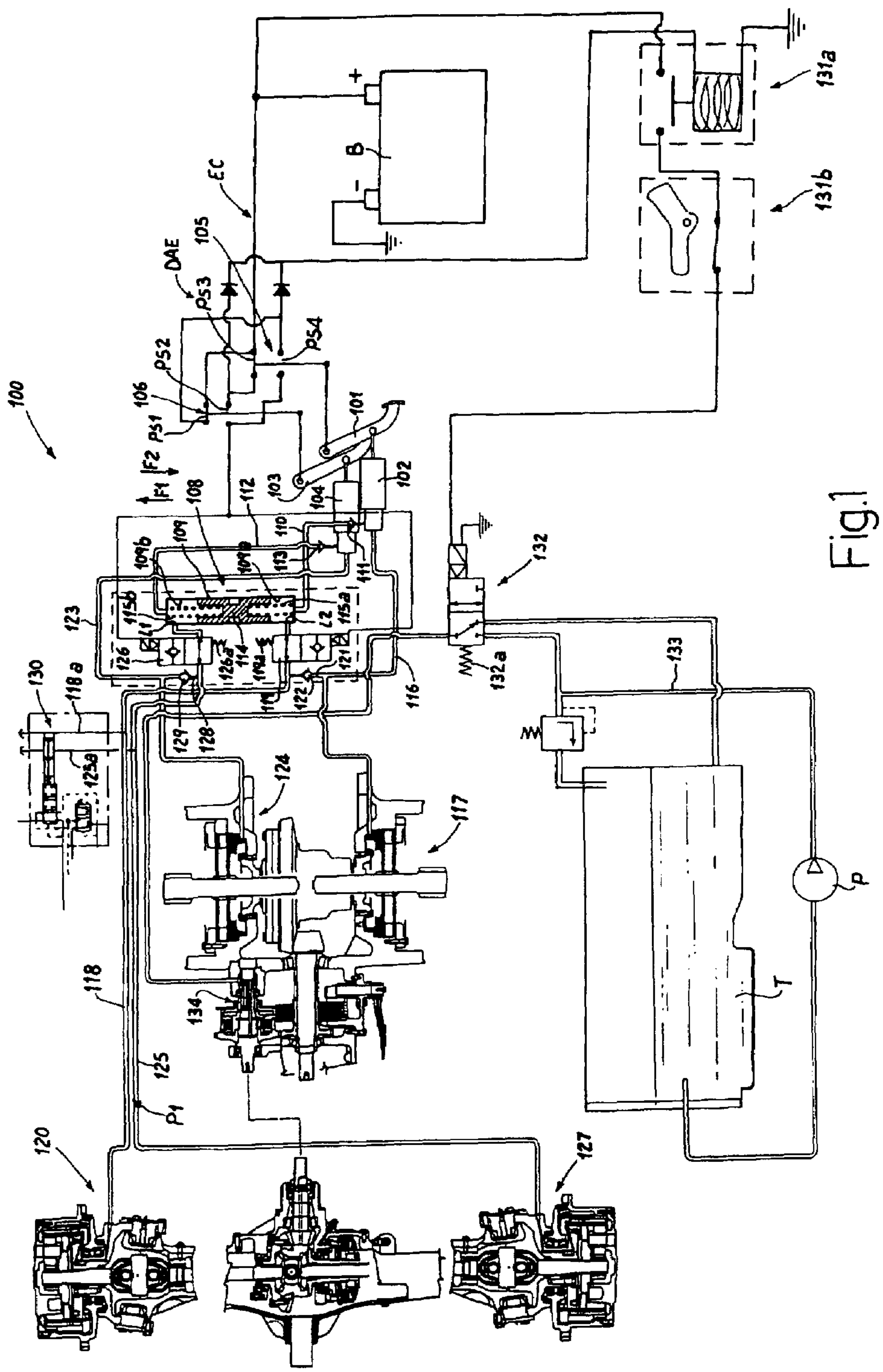
FIG. 1 shows a first embodiment of the device according to the present invention.

FIG. 1 is an overview schematic of a braking system and related components in accordance with the present invention. The whole braking device of the present invention is shown generally as 100.

Braking device 100 comprises a left pedal 101 connected to a respective brake booster 102, and a right pedal 103 connected to a respective brake booster 104. The term "booster" as used here is intended to mean a "master cylinder" capable of supplying the hydraulic circuits connected to it with large quantities of pressurized oil using the physical force of the operator and the hydraulic power of the tractor. As will be seen, in the case of high-range tractors, boosters as opposed to normal "master cylinders" are preferred (see below).

Each pedal 101, 103 is connected mechanically to a respective electric switch 105, 106 powered by a battery B by means of an electric circuit EC. Switches 105, 106 form part of a more general electric actuating device DAE, in turn forming part of electric circuit EC. The function of switches 105, 106 is explained fully below.

As shown in FIG. 1, boosters 102 and 104 are connected hydraulically to each other by a compensating device 108.

As explained in more detail below, when the operator brakes using only one pedal 101, 103, a non-return valve 111, 113, forming part of booster 102, 104, closes a partial hydraulic circuit of the other pedal (see below). That is, booster 102 (of pedal 101) is connected hydraulically to a chamber **109*a* of a one-way valve 109 by a line 110 fitted with non-return valve 111. Symmetrically, booster 104 (of pedal 103) is connected hydraulically to a chamber 109*b* of one-way valve 109 by a line 112 fitted with non-return valve 113. Chambers 109*a* and 109*b* are separated by a floating shutter 114 operated by two identical return springs 115*a* and 115*b*, each housed in a respective chamber 109*a*, 109*b***.

A main hydraulic line 116 for hydraulically feeding a rear left brake 117 also extends from booster 102. A secondary hydraulic line 118 for hydraulically feeding a front right brake 120 extends from chamber **109*a* and through a solenoid slide valve 119 (see below) stressed elastically by a spring 119*a*. Lines 116 and 118 are connected to each other by a conduit 121, which, by means of a one-way valve 122, permits pressurized-oil flow from secondary hydraulic line 118** to main hydraulic line 116, but not vice versa, to ensure complete drainage of rear brake 117 when pedal 101 is released.

Similarly, a main hydraulic line 123 for hydraulically feeding a right rear brake 124 also extends from booster 104. A secondary hydraulic line 125 for hydraulically feeding a front left brake 127 extends from chamber 109*b* and through a solenoid slide valve 126 (see below) stressed elastically by a spring 126*a*. Lines 123 and 125 are connected to each other by a conduit 128, which, by means of a one-way valve 129, permits pressurized-oil flow from main hydraulic line 123 to secondary hydraulic line 125, but not vice versa, to ensure complete drainage of rear brake 124 when pedal 103 is released.

As will be seen, when braking using both pedals 101 and 103 (connected mechanically to each other, e.g. by means of a mechanical bolt inserted by the operator, as required by the highway code when on-road driving the tractor), valves 119 and 126 remain open, and braking of all four wheels is perfectly balanced by simultaneously operating all four brakes 117, 124, 120, and 127 (see below).

Two hydraulic circuits are thus formed, i.e. a first circuit hereby generally referred to as CIR1 connected to pedal 101 and comprising lines 110, 118, 116 and booster 102; and a second circuit hereby generally referred to as CIR2 connected to pedal 103 and comprising lines 112, 125, 123 and booster 104. In other words, CIR1 and CIR2 are two separate circuits when operated individually, but become a single balanced-pressure circuit, by virtue of compensating device 108, when both pedals 101 and 103 are pressed simultaneously. The two hydraulic circuits CIR1 and CIR2 are connected solely by compensating device 108, which, in the event of a slight unbalance between the two circuits, restores balance by moving floating shutter 114 in the direction of arrow F1 or F2 to equalize the pressure in both circuits CIR1, CIR2.

As shown in FIG. 1, switches 105 and 106 are open, so that respective valves 119 and 126 are also deenergized and open.

Secondary hydraulic lines 118, 125 are connected hydraulically by respective conduits 118*a*, 125*a* to a known trailer brake 130, which is advantageously supplied simultaneously by both separate circuits CIR1 and CIR2, so that, if either of circuits CIR1, CIR2 breaks down, cross-braking of two brakes (117, 120 or 124, 127) and trailer brake 130 would still remain. Trailer brake 130 is therefore also operated when secondary hydraulic lines 118, 125 are supplied by respective boosters 102, 104.

In actual use, if, for example, only right pedal 103 is pressed, switch 106, connected mechanically to pedal 103, switches from position PS1 to position PS2, while switch 105 of left pedal 101 stays in position PS3. Electric circuit EC is therefore closed, so that both solenoid valves 119 and 126 are powered simultaneously. The electric current energizes the coils of solenoid valves 119 and 126, so that the slides of solenoid valves 119 and 126 move into a closed position in opposition to the elastic action of respective springs 119*a* and 126*a*. When both solenoid valves 119 and 126 are closed, pressurized-oil supply to secondary hydraulic lines 118, 125 and to trailer brake 130 is cut off, so that right pedal 103 alone only activates rear right brake 124, but not front brakes 120, 127 or rear left brake 117. Similarly, if, for example, only left pedal 101 is pressed, switch 105, connected mechanically to pedal 101, switches from position PS3 to position PS4, while switch 106 of right pedal 103 stays in position PS1.

In another case, electric circuit EC is closed, so that both solenoid valves 119 and 126 are powered simultaneously. As with right pedal 103, the electric current energizes the coils of solenoid valves 119 and 126, so that the slides of solenoid valves 119 and 126 move into a closed position in opposition to the elastic action of respective springs 119*a* and 126*a*. When both solenoid valves 119 and 126 are closed, pressurized-oil supply to secondary hydraulic lines 118 and 125 and to trailer brake 130 is cut off, so that left pedal 101 alone only activates rear left brake 117, but not front brakes 120 and 127 or rear right brake 124.

Conversely, if both pedals 101 and 103 are pressed, switch 106 switches from position PS1 to position PS2, while switch 105 switches from position PS3 to position PS4, thus opening circuit EC. In which case, solenoid valves 119 and 126 remain "open", thus enabling pressurized-oil supply by boosters 102 and 104 to secondary hydraulic lines 118 and 125 (and therefore to front right brake 120 and front left brake 127 respectively). As stated, in this case, trailer brake 130 will also be activated. In an emergency (particularly when on-road driving the tractor), and when both pedals 101 and 103 are pressed simultaneously, brakes 117, 120, 124, and 127 are therefore all activated simultaneously.

Moreover, braking action is balanced hydraulically by compensating device 108 on the two secondary hydraulic lines 118 and 125.

When circuit EC is open, as when both pedals 101, 103 are pressed simultaneously, electric current is cut off to a relay 131*a* and a switch 131*b* governing opening/closing of a solenoid valve 132 subjected to the action of a spring 132*a*. Only one of relay 131*a* and switch 131*b* need be open to engage a known clutch 134 governing engagement of the four drive wheels (the situation shown in FIGS. 1, 2). Clutch 134 is a "positive" type and therefore normally engaged. It should be pointed out that switch 131*b* may be opened by the operator when engagement of all four drive wheels (i.e. engagement of clutch 134 in the "normal" position) is desired.

In fact, solenoid valve 132 is normally in the "closed" position, as shown in FIG. 1, when relay 131*a* is deenergized (i.e. open), so that oil supply to clutch 134 from a line 133 is cut off, thus preventing release of clutch 134. Solenoid valve 132 is fed over line 133 by means of a pump P which pumps oil from a tank T.

Conversely, if circuit EC is closed (see above), relay 131*a* is supplied with electric current and closes to energize solenoid valve 132, the magnet of which moves its slide into the open position (not shown in FIG. 1) in opposition to spring 132*a*, thus allowing pressurized-oil flow to clutch 134 to release it.

This represents a substantial improvement in the braking capacity of the tractor, in that, when clutch 134 is engaged, the four drive wheels (not shown) are connected mechanically to one another, so that rear brakes 117, 124 also act indirectly on the front wheels (not shown).

The following explains how braking device 100 performs in the event of a failure (or defect) of a conduit or other component part. In the event of leakage along line 125 at point P1, for example, operation of pedal 103 only brakes rear right brake 124, but not front left brake 127. If pedal 101 is operated simultaneously, however, brakes 117 and 120 are also activated (cross-braking for more stable braking performance) and are sufficient to stop the tractor. Operating pedal 101 simultaneously also activates trailer brake 130 and clutch 134 of the four drive wheels, as described above. In the event, as stated, of leakage along line 125 at point P1, both line 125 itself and chamber 109*b* begin emptying (or rather, losing pressure), so that operation of pedal 101 alone pressurizes chamber 109*a*, and floating shutter 114 moves as far as it can go in the direction of arrow F1 to limit oil draw by lines 116 and 118.

The same applies in the event of a fault along line 118; in which case, floating shutter 114 moves as far as it can go in the direction of arrow F2 to limit oil draw by lines 116, 118.

Even in the event of malfunctioning (hydraulic or electric) of a solenoid valve 119, 126, simultaneous braking (i.e. operating both pedals 101 and 103) is still ensured by both solenoid valves 119 and 126, as stated, being normally open (deenergized) as required for simultaneous braking of all four wheels (safety condition).

The advantages of the device according to the present invention substantially lie in the fact that, even in the event of breakdown of a line or component part, emergency braking of at least two of the four braking wheels is ensured, together with automatic engagement of the clutch of the four drive wheels and the trailer brake.

Figure 2:
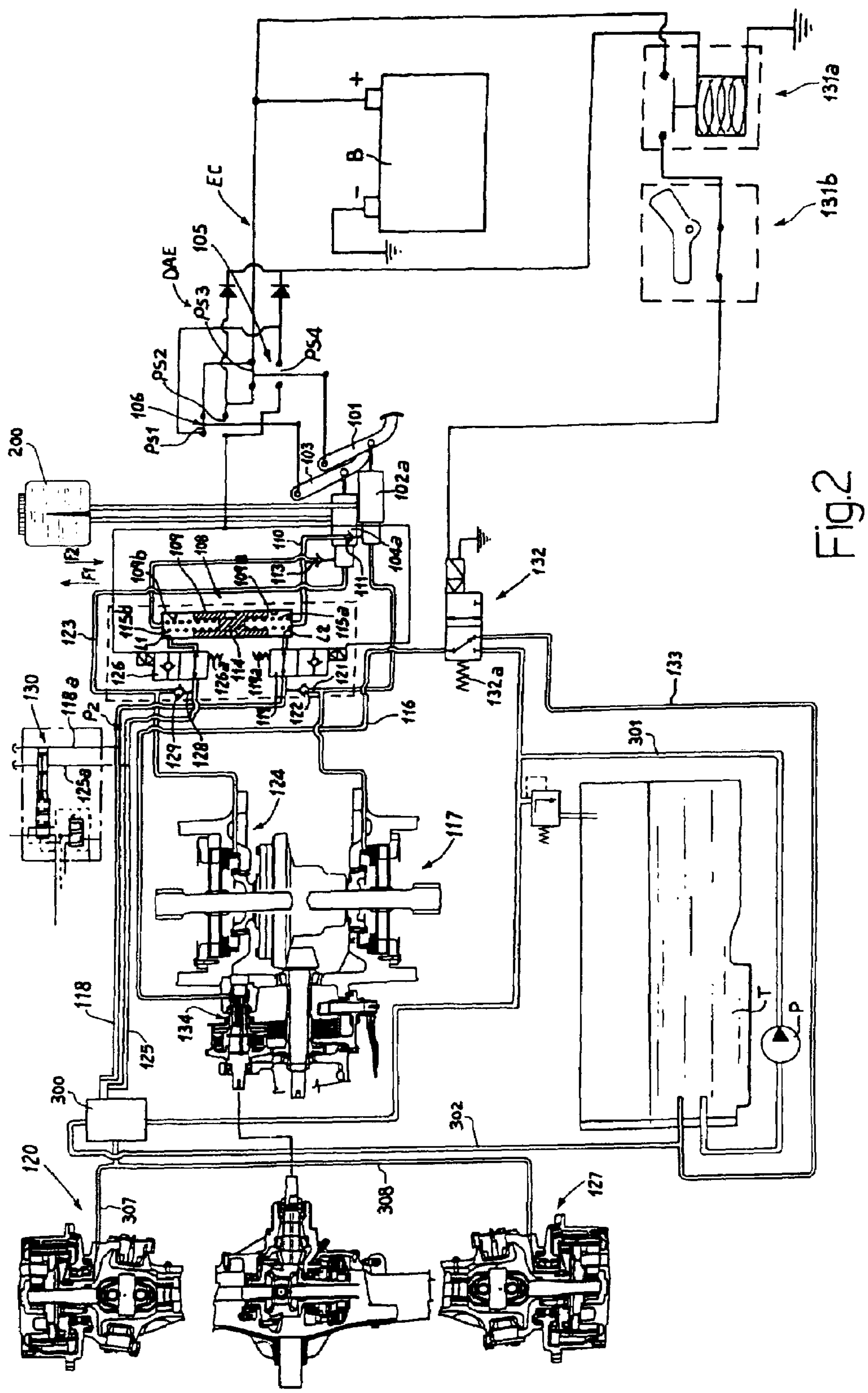
FIG. 2 shows a second embodiment of the device according to the present invention.

FIG. 2 shows a second embodiment of braking device 100 according to the present invention. Any component parts identical to those in FIG. 1 are indicated using the same reference numbers in FIG. 2. In this case, boosters 102 and 104 as shown in the FIG. 1 embodiment are replaced respectively by normal master cylinders 102*a* and 104*a* which use small quantities of oil, and which are fed with oil from an overhead tank 200. In this case, as opposed to being power-assisted by a booster, braking therefore depends solely on the physical force applied by the operator on pedals 101, 103.

Since the second embodiment of braking device 100, as shown in FIG. 2, employs substantially the same hydraulic and electric components as the first embodiment in FIG. 1, operation of these components needs no further description.

As shown in FIG. 2, lines 118 and 125 terminate in a proportional hydraulic valve 300. A detailed description of a proportional hydraulic valve 300 is contained in the Applicant's European Patent Application EP-1 174 320. The content of such European Patent Application EP-1 174 320 is to be considered an integral part of the present application.

Figure 3:
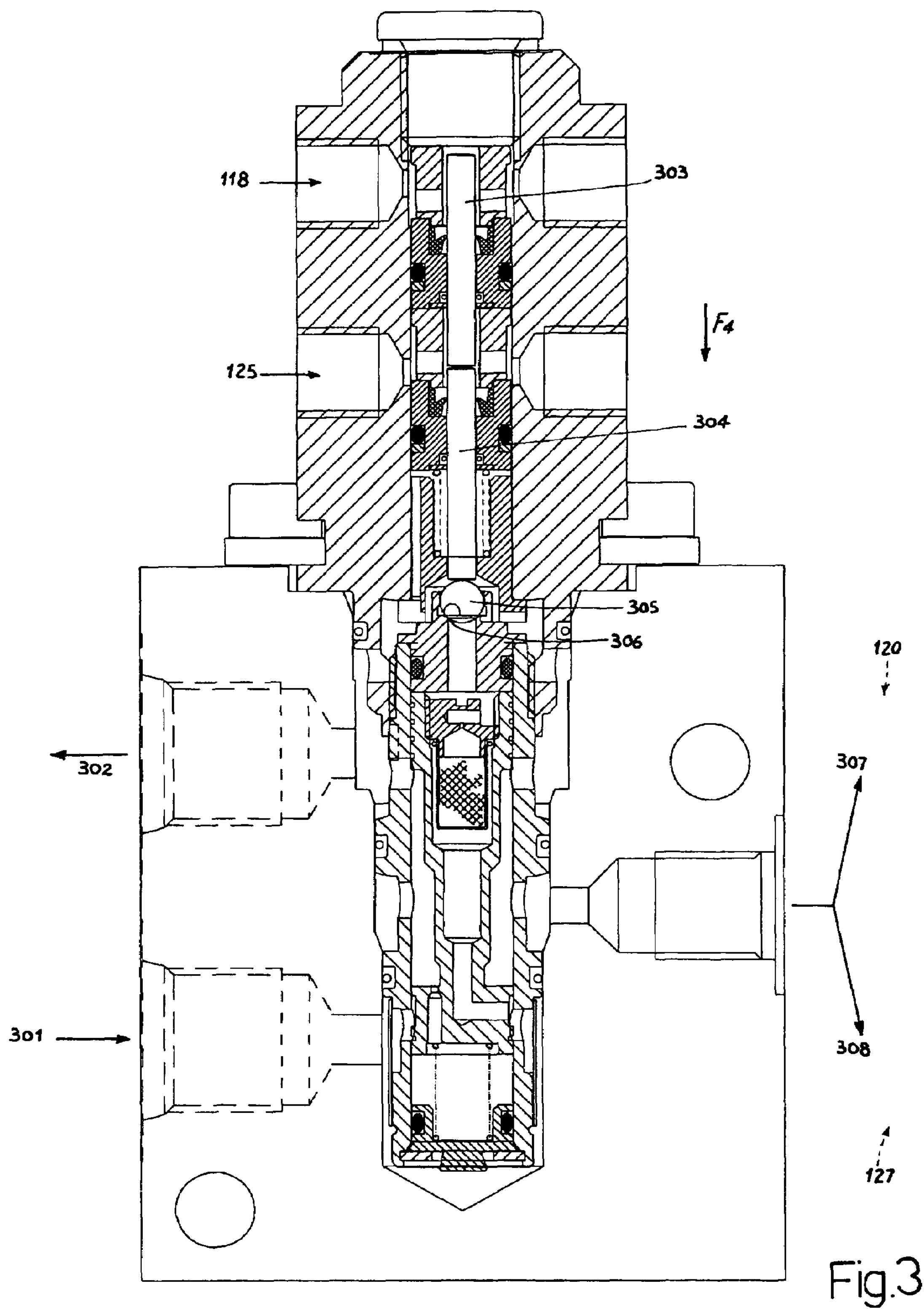
FIG. 3 shows an enlarged detail of the FIG. 2 embodiment.

Valve 300 is fed with pressurized oil by a pump P along a line 301 and, as before, from tank T. When valve 300 is closed, i.e. when pressurized-oil supply along lines 118, 125 is cut off (see below), the small amount of incoming oil along line 301 is drained along a line 302, and zero pressure remains along lines 307, 308 (see also FIG. 3).

Conversely, when valve 300 is supplied with pressurized oil along line 118, a first piston 303 (see FIG. 3) slides down (in the direction of arrow F4) and acts on a second piston 304 on which it rests. Piston 304 in turn presses on a ball shutter 305, which seals a passage 306 through which oil would leak into a drain 302.

Valve 300 therefore opens, as described with reference to the proportional valve in the European Patent Application EP-1 174 320, and, as opposed to being drained along line 302 (which is closed), the incoming pressurized oil along line 301 flows simultaneously along line 307 to brake 120, and along line 308 to brake 127 (to simultaneously activate both brakes 120, 127).

Similarly, when valve 300 is only supplied with pressurized oil along line 125, only second piston 304 slides down to press on ball shutter 305, which seals passage 306 through which oil would leak into drain 302. At this point, brakes 120 and 127 are activated in the same way as for pressurized-oil supply from line 118. Valve 300 therefore opens even when supplied with pressurized oil by both lines 118 and 125.

The second embodiment of device 100 (FIG. 2) operates in exactly the same way as the first embodiment in FIG. 1, to which the reader is referred. In the event, for example, of a break along line 118 at point P2 (FIG. 2), simultaneous operation of pedals 101 and 103 would still simultaneously activate both front brakes 120 and 127 controlled by the good line 125 (as stated, solenoid valves 119 and 126 are still open on account of both pedals 101 and 103 being pressed simultaneously). At the same time, rear right brake 124 is also activated, and trailer brake 130, and clutch 134 are engaged, with all the benefits described previously in terms of overall braking of the vehicle.

What is claimed is:

1. A braking device for a tractor, comprising:

a first hydraulic circuit for activating at least a rear left brake;

a second hydraulic circuit for activating at least a rear right brake; and a compensating device located between the first hydraulic circuit and the second hydraulic circuit to equalize hydraulic pressures in the first and second hydraulic circuits;

wherein the first hydraulic circuit comprises a main hydraulic line and a secondary hydraulic line, and the second hydraulic circuit comprises a main hydraulic line and a secondary hydraulic line; opening and closing of each of the secondary hydraulic lines being controlled by a respective solenoid valve; and the secondary hydraulic line of the first hydraulic circuit passes through the compensating device and through the respective solenoid valve, and the secondary hydraulic line of the second hydraulic circuit passes through the compensating device and through the respective solenoid valve, wherein the solenoid valves are activated respectively by a first brake pedal and a second brake pedal via an electric actuating device; and wherein simultaneous actuation of both hydraulic circuits activates at least a front brake.

2. A device as claimed in claim 1, wherein the first hydraulic circuit also activates at least a front right brake and the second hydraulic circuit also activates at least a front left brake.

3. A device as claimed in claim 1, wherein at least one hydraulic circuit activates a proportional valve for simultaneously activating a front right brake and a front left brake.

4. A device as claimed in claim 3, wherein the proportional valve is supplied with oil over a line.

5. A device as claimed in claim 1, wherein the electric actuating device comprises: a first switch connected mechanically to the first brake pedal, and a second switch connected mechanically to the second brake pedal.

6. A device as claimed in claim 5, wherein individual operation of the first brake pedal or the second brake pedal closes both of the solenoid valves thus deactivating both secondary hydraulic lines.

7. A device as claimed in claim 5, wherein the simultaneous operation of the first brake pedal and the second brake pedal keeps the solenoid valves open, activating the secondary hydraulic lines and braking all four drive wheels of the tractor.

8. A device as claimed in claim 5, wherein the simultaneous operation of the first brake pedal and the second brake pedal activates a clutch mechanically connecting the four drive wheels of the tractor.

9. A braking device for a tractor, comprising:

a first hydraulic circuit for activating at least a rear left brake;

a second hydraulic circuit for activating at least a rear right brake; and a compensating device located between the first hydraulic circuit and the second hydraulic circuit to equalize hydraulic pressures in the first and second hydraulic circuits;

wherein the first hydraulic circuit comprises a main hydraulic line and a secondary hydraulic line, and the second hydraulic circuit comprises a main hydraulic line and a secondary hydraulic line, opening and closing of each of the secondary hydraulic lines being controlled by a respective solenoid valve; and the secondary hydraulic line of the first hydraulic circuit passes through the compensating device and through the respective solenoid valve, and the secondary hydraulic line of the second hydraulic circuit passes through the compensating device and through the respective solenoid valve, wherein simultaneous actuation of both hydraulic circuits activates at least a front brake; and wherein the first and second hydraulic circuits are connected hydraulically to a trailer brake; the trailer brake being activated even when only the first hydraulic circuit or the second hydraulic circuit is activated.

* * * * *